US012692957B2

(12) United States Patent
Hestetun

(10) Patent No.: US 12,692,957 B2
(45) Date of Patent: Jul. 28, 2026

(54) MULTI VALVE ELECTRICAL ACTUATOR

(71) Applicant: Vetco Gray Scandinavia AS, Stavanger (NO)

(72) Inventor: Steinar Lindemann Hestetun, Billingstad (NO)

(73) Assignee: Vetco Gray Scandinavia AS, Stavanger (NO)

( * ) Notice: Subject to any disclaimer, the term of this patent is extended or adjusted under 35 U.S.C. 154(b) by 0 days.

(21) Appl. No.: 18/043,862

(22) PCT Filed: Aug. 27, 2021

(86) PCT No.: PCT/EP2021/025326
§ 371 (c)(1),
(2) Date: Mar. 2, 2023

(87) PCT Pub. No.: WO2022/048793
PCT Pub. Date: Mar. 10, 2022

(65) Prior Publication Data
US 2023/0258279 A1 Aug. 17, 2023

(30) Foreign Application Priority Data
Sep. 7, 2020 (NO) .................................... 20200975

(51) Int. Cl.
*F16K 31/04* (2006.01)
*E21B 34/16* (2006.01)
*F16K 37/00* (2006.01)

(52) U.S. Cl.
CPC ............ *F16K 31/047* (2013.01); *E21B 34/16* (2013.01); *F16K 37/00* (2013.01)

(58) Field of Classification Search
CPC ...... E21B 33/0355; E21B 34/16; E21B 41/04; F16K 11/14; F16K 11/165; F16K 31/046;
(Continued)

(56) References Cited

U.S. PATENT DOCUMENTS

| | | | |
|---|---|---|---|
| 4,082,247 | A | 4/1978 | Dalton |
| 4,749,004 | A | 6/1988 | Peash |

(Continued)

FOREIGN PATENT DOCUMENTS

| | | |
|---|---|---|
| CN | 200975554 Y | 11/2007 |
| CN | 201401546 Y | 2/2010 |

(Continued)

OTHER PUBLICATIONS

The Subsea Production & Processing Systems Market 2016-2026: CAPEX Forecasts for Umbilicals, Risers, Flowlines, Controls, Trees,Manifolds and Tie-ins, 2016, ReportBuyer, 7 pages.

*Primary Examiner* — Reinaldo Sanchez-Medina
(74) *Attorney, Agent, or Firm* — Hogan Lovells US LLP

(57) ABSTRACT

The present invention relates to a subsea manifold valve actuator, with a rotary actuator rotating a drive gear and a linear actuator shifting the drive gear linearly between different positions in mesh with different driven gears, each operating a valve of a subsea manifold for oil and gas. A valve actuator controller is connected to the rotary actuator and the linear actuator. Furthermore methods for operating and installing the subsea manifold valve actuator are disclosed.

11 Claims, 7 Drawing Sheets

(58) Field of Classification Search
    CPC ...... F16K 31/047; F16K 31/53; F16K 31/535;
                         Y10T 137/86928
    See application file for complete search history.

(56)                    References Cited

U.S. PATENT DOCUMENTS

| | | | |
|---|---|---|---|
| 9,581,255 B2* | 2/2017 | Zieger .................. | F16K 19/006 |
| 10,569,561 B2 | 2/2020 | Arnold | |
| 2004/0134665 A1 | 7/2004 | Greeb et al. | |
| 2009/0230338 A1 | 9/2009 | Sanders et al. | |
| 2010/0025610 A1 | 2/2010 | Eschborn et al. | |
| 2014/0033842 A1 | 2/2014 | Morin | |
| 2016/0201423 A1* | 7/2016 | Biester ................. | E21B 33/063 |
| | | | 251/1.1 |

FOREIGN PATENT DOCUMENTS

| | | | |
|---|---|---|---|
| CN | 202884214 U | 4/2013 | |
| CN | 104989866 A | 10/2015 | |
| CN | 106931225 A | 7/2017 | |
| CN | 110985712 A | 4/2020 | |
| EP | 2886916 A1 | 6/2015 | |
| WO | 2005111484 A2 | 11/2005 | |
| WO | 2013041842 A2 | 3/2013 | |
| WO | 2016096934 A1 | 6/2016 | |
| WO | 2017087850 A1 | 5/2017 | |
| WO | 2018078397 A1 | 5/2018 | |

* cited by examiner

MULTI VALVE ELECTRICAL ACTUATOR

FIELD OF THE INVENTION

The invention relates to a hydrocarbon production manifold valve actuator.

BACKGROUND

Manifolds for hydrocarbon wells are used to merge and control the flow of hydrocarbons from multiple wells and to inject fluids. Manifolds are located subsea, topside or onshore.

Manifolds utilize valves such as branch valves and flow-line header valves to control fluid paths. Subsea manifold valves are typically operated individually by ROVs if not required to be remotely operated. Remote operated valves are traditionally hydraulically operated and the hydraulic operated valves require hydraulic supply from host surface facilities through an umbilical and a nearby control module to distribute hydraulic supply to the different valves.

It is an object of the present invention to provide a remotely controlled actuator located on the manifold to operate multiple valves and to avoid ROV operation or hydraulically operated valves that require hydraulic supply and a nearby control module.

SUMMARY OF THE INVENTION

The invention relates to a hydrocarbon production manifold valve actuator including a rotary actuator in driving relationship with a drive gear, a linear actuator adapted to shift the drive gear linearly along an axis of rotation of the drive gear between a first position in mesh with a first driven gear connected to a first valve operating shaft operating a first valve, and at least a second position in mesh with a second driven gear connected to a second valve operating shaft operating a second valve, and a valve actuator controller connected to the rotary actuator and the linear actuator.

The invention further relates to said valve actuator wherein the linear actuator further is adapted to shift the drive gear linearly along the axis of rotation of the drive gear to a third position in mesh with a third driven gear connected to a third valve operating shaft operating a third valve.

The invention further relates to said valve actuator wherein the each valve operating shaft is connected to a valve socket adapted to fit onto and engage each of the valves to be operated.

The invention further relates to said valve actuator wherein each valve operating shaft is connected to a auxiliary coupling adapted to be operated by an override tool.

The invention further relates to said valve actuator wherein the number of valves each being in driving relationship with a driven gear corresponds to a number of positions of the drive gear linearly along the axis of rotation.

The invention further relates to said valve actuator wherein a drive gear shaft extends between the rotary actuator and the drive gear, and wherein the linear actuator is adapted to move the drive gear along a rotational axis of the drive gear shaft.

The invention further relates to said valve actuator wherein a drive gear shaft extends between the rotary actuator and the drive gear, and wherein the linear actuator is adapted to move the drive gear shaft and the drive gear along an axis of rotation of the drive gear shaft.

The invention further relates to said valve actuator wherein the valve actuator further includes an actuator base and a housing fixed to the actuator base providing a water-tight room which may be filled with a liquid.

The invention further relates to said valve actuator further including a controller, a force sensor and a position sensor monitoring the linear actuator, adapted to feed input to the controller, and a torque sensor and a rotation sensor monitoring the rotary actuator, adapted to feed input to the controller.

The invention further relates to a method of operating said valve actuator including the steps of identifying a need for actuating one of the at least two valves, actuating the linear actuator to shift the drive gear linearly along the axis of rotation of the drive gear in mesh with the driven gear of the identified valve, and actuating the rotary actuator to operate the identified valve.

The invention further relates to said method of operating said valve actuator wherein the step of actuating the rotary actuator to operate the identified valve is replaced with the step of actuating an auxiliary coupling to operate the identified valve.

The invention further relates to said method of operating said valve actuator wherein the step of actuating the linear actuator to position the drive gear in mesh with the driven gear of the identified valve includes feeding a signal from a force and a position sensor to a controller.

The invention also relates to a method of installing said valve actuator including the steps of landing the valve actuator and engaging at least two valves on a subsea hydrocarbon production manifold, identifying a need for actuating one of the at least two valves, positioning the drive gear in mesh with the driven gear of the identified valve and operating the valves.

The mentioned valve actuator may also be used on a subsea hydrocarbon fluid recovery manifold.

BRIEF DESCRIPTION OF THE DRAWINGS

FIG. 8 is a schematic representation of an actuator system of the invention.

DETAILED DESCRIPTION

Figure 1:
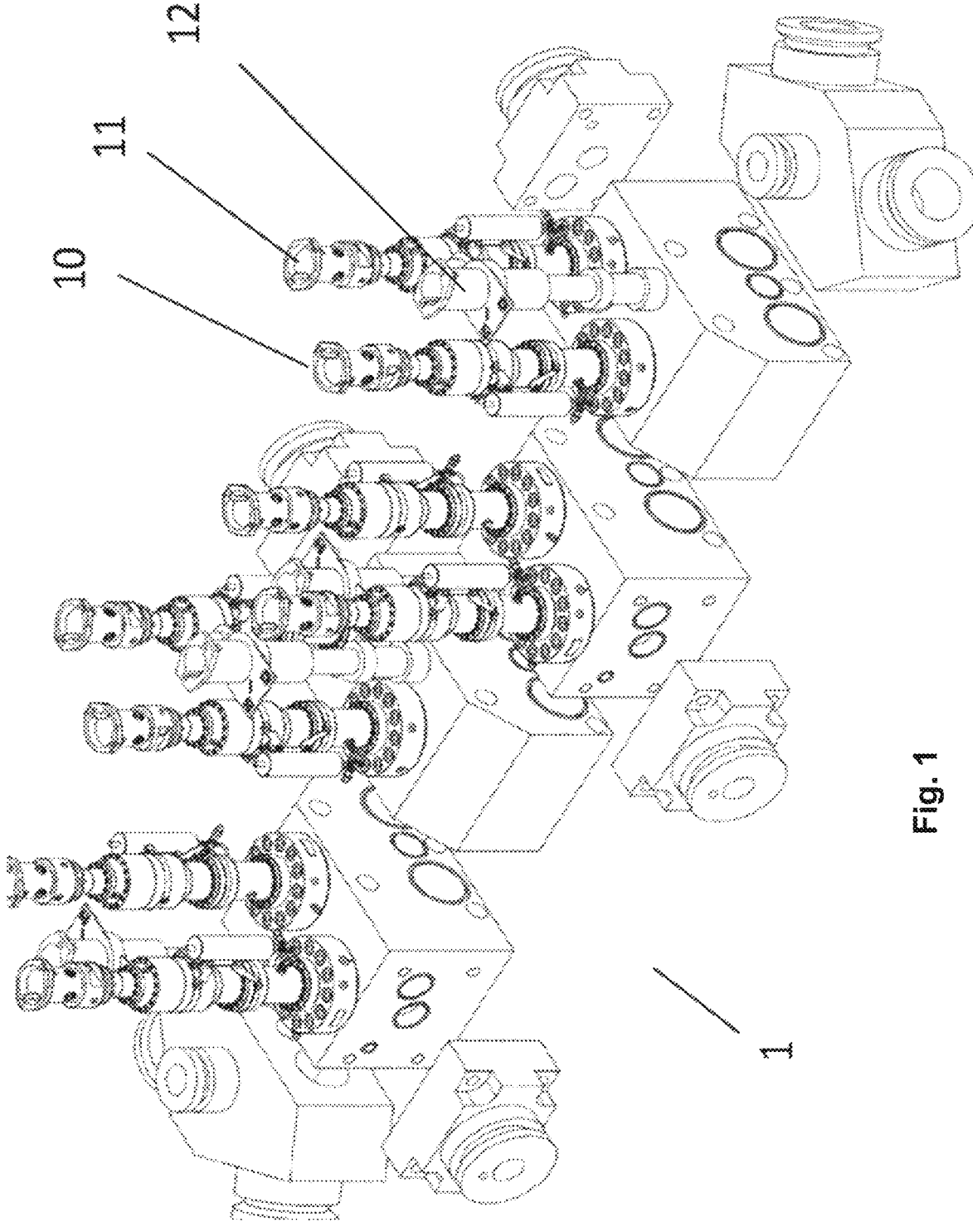
FIG. 1 is an exploded perspective view of a manifold according to prior art.

FIG. 1 is an exploded perspective view of a subsea hydrocarbon production manifold 1 according to prior art. The subsea hydrocarbon production manifold 1 includes four header configuration blocks. Each header configuration block comprises a group three parallel branch valves: a first branch valve of a production header 10, a second branch valve of a production header 11 and a branch valve of a service header 12. These branch valves are located in a proximity of each other in a triangle formation.

FIG. 1 serves as an example of a subsea hydrocarbon production manifold 1 having at least one group of valves. The valves in the group are located in proximity to each other.

Figure 2:
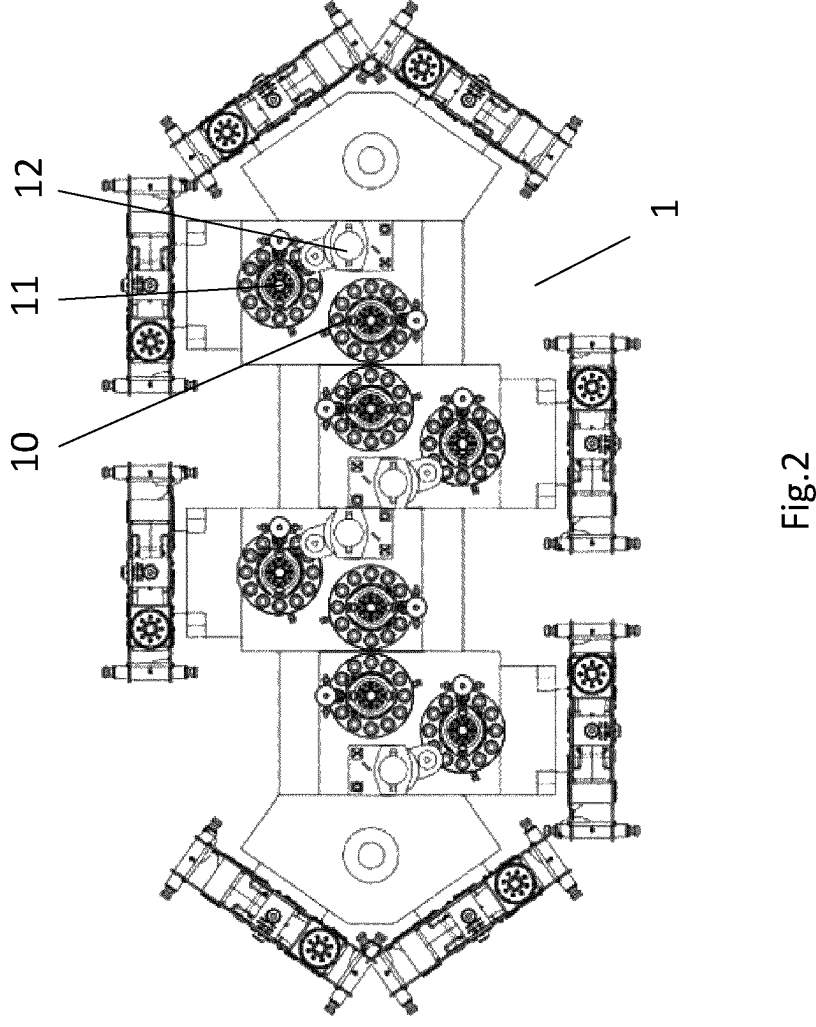
FIG. 2 is a top elevation of the manifold of FIG. 1 in an assembled state.

FIG. 2 is a top elevation of the manifold of FIG. 1 as assembled.

Figure 3:
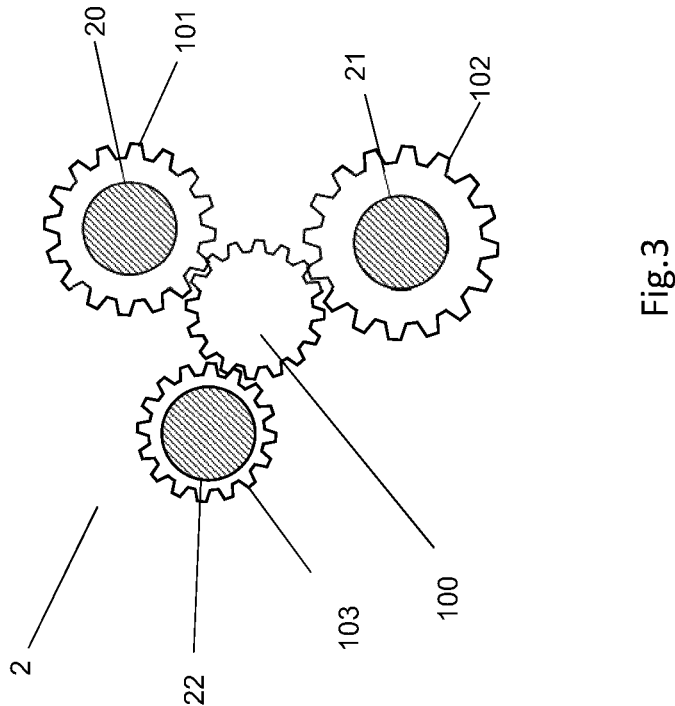
FIG. 3 is a schematic representation of an embodiment of the invention in a top elevation.

FIG. 3 is a schematic representation of a gear configuration of the invention comprising, a first valve operating shaft 20, a second valve operating shaft 21, and a third valve operating shaft 22 located in a proximity to each other in a triangle formation. FIG. 3 further shows three driven gears operating the valve operating shafts. A first driven gear 101 operates the first valve operating shaft 20, a second driven gear 102 operates the second valve operating shaft 21, and a third driven gear 103 operates the third valve operating shaft 22. A drive gear 100 of a drive assembly (not shown) is located between the three driven gears. The drive gear 100 is positioned to engage each of the driven gears individually. When engaged, the drive gear 100 is rotated, to rotate each of the driven gears and thereby rotating the valve operating shafts. The driven gears are preferably engaged individually, but the drive gear 100 may be designed to engage more than one driven gear at a time. The driven gears may have different diameters. The teeth of the drive gear 100 are sized to mesh with the teeth of the driven gears, although the schematic representation may deviate from this perception.

Figure 4:
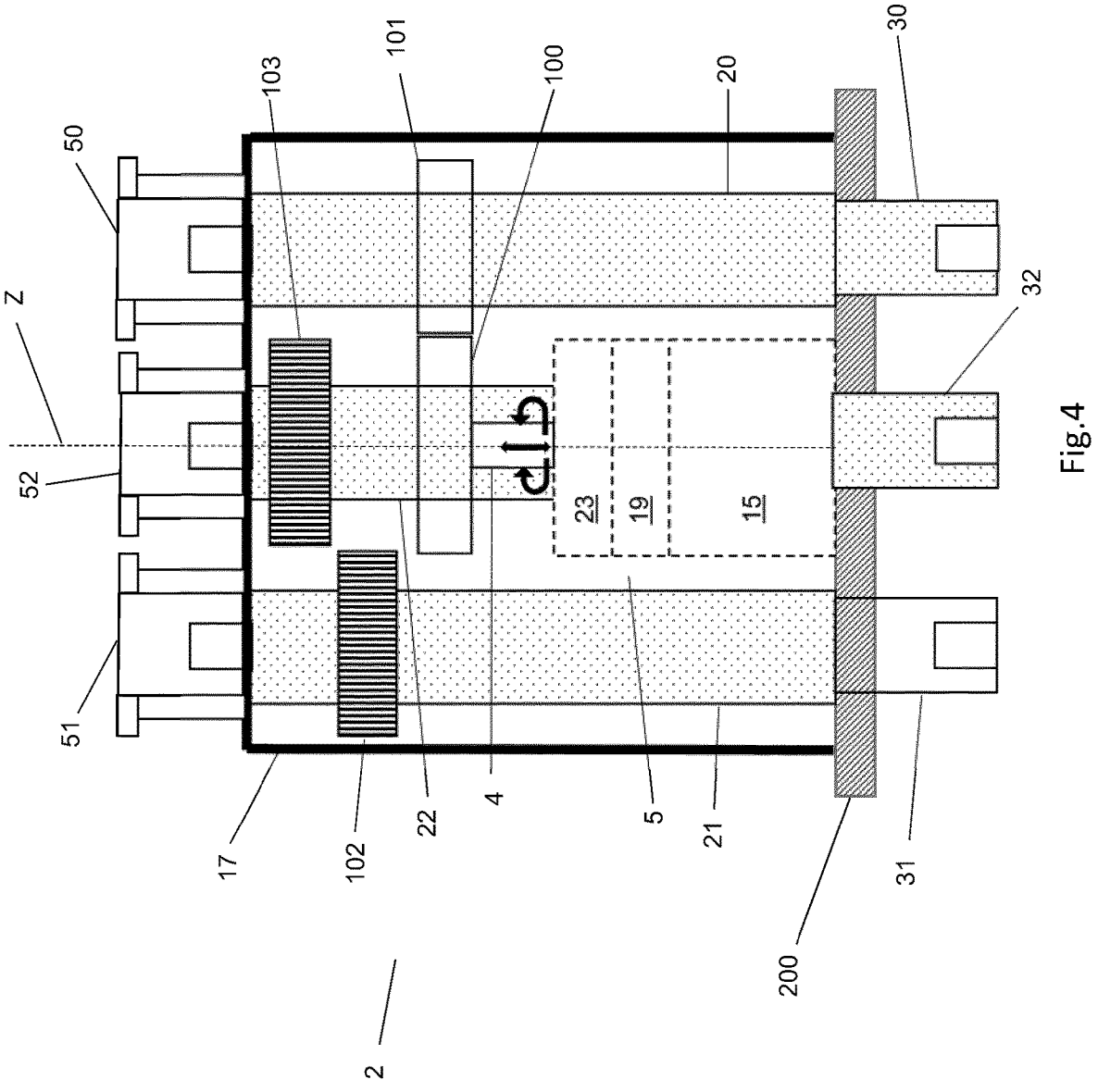
FIG. 4 is a schematic representation of an embodiment of the invention in a side view where a drive gear is engaged with a first driven gear.

FIG. 4 is a side view of the valve actuator 2 of the invention. A drive assembly 5 is located between a first valve operating shaft 20, a second valve operating shaft 21 and a third valve operating shaft 22. A gear shaft 4 is connected to a drive gear 100 and to the drive assembly 5. A first driven gear 101 connected to the first valve operating shaft 20 is located below a second driven gear 102 connected to the second valve operating shaft 21 which is located below a third driven gear 103 connected to a third valve operating shaft 22. The thickness of the driven gears do not overlap along a vertical axis Z extending along the gear shaft 4. The drive assembly 5 includes a linear actuator 23 moving the gear shaft 4 to a specific position to allow the drive gear 100 to engage any of the driven gears. The gear shaft 4 is oriented in parallel with the valve operating shafts 20, 21 and 22. The drive assembly 5 further includes a rotary actuator 19 to rotate the gear shaft 4 to rotate any of the driven gears via the drive gear 100. The drive assembly 5 also includes an actuator controller 15 which is connected to the rotary actuator 19 and the linear actuator 23. The diameter of the drive gear 100 is dimensioned to allow the drive gear 100 to mesh with and thereby operate any of the driven gears. FIG. 4 shows an embodiment where the drive gear 100 is engaged with the first driven gear 101. The ends of teeth of the gears may be tapered to facilitate axial movement between the gears and to ensure that the driven gears not prevent the axial movement of the drive gear 100.

The valve operating shafts are connected to auxiliary couplings adapted to be engaged by an override tool in order to override the valve actuator 2. The first valve operating shaft 20 is connected to a first auxiliary coupling 50, the second valve operating shaft 21 is connected to a second auxiliary coupling 51 and the third valve operating shaft 22 is connected to a third auxiliary coupling 52. An ROV may operate the valve actuator 2 by engaging and rotating any of the auxiliary couplings. The auxiliary couplings may be a bucket type coupling adapted to receive a corresponding socket of an ROV override tool.

The valve operating shafts are connected to valve sockets adapted to engage valves. The first valve operating shaft 20 is connected to a first valve socket 30, the second valve operating shaft 21 is connected to a second valve socket 31 and the third valve operating shaft 22 is connected to a third valve socket 32. The valve actuator 2 may be permanently installed on valves on a manifold, in order to operate the valves. The valve actuator 2 may also be retrofitted to the valves on the manifold. The valve actuator 2 may also be removed from the valves on the manifold. Each valve socket is adapted to fit onto and engage a valve stem. Each valve (40, 41, 42) is equipped with a coupling fixed to the end of a valve stem of the valve (see FIG. 7). Each coupling is adapted to connect to the valve sockets (30, 31, 32). The couplings may be bucket type couplings (400, 410, 420) adapted to receive a valve socket (30, 31, 32) of the valve actuator 2 (see FIG. 7). When a valve socket is fitted onto and engaged with a valve by means of its coupling, the motor gear 100 is rotated, to rotate a valve operating shaft, rotating the valve socket connected to the valve operating shaft, and thereby rotating the engaged valve. The valve actuator 2 is adapted to engage the at least two valves. The valves may be any conventional valve type, and the valves may be branch valves with valve housings extending from the manifold as shown in FIG. 1. Each valve controls fluid flow in the manifold.

The valve actuator 2 may be enclosed by a housing 17 and an actuator base 200, providing a room for components of the valve actuator 2. This room may be watertight and filled with a liquid to prevent the housing from collapsing due to hydrostatic pressure in deep sea. A pressure regulating bladder (not shown) may be installed on the housing 17 wall.

Figure 5:
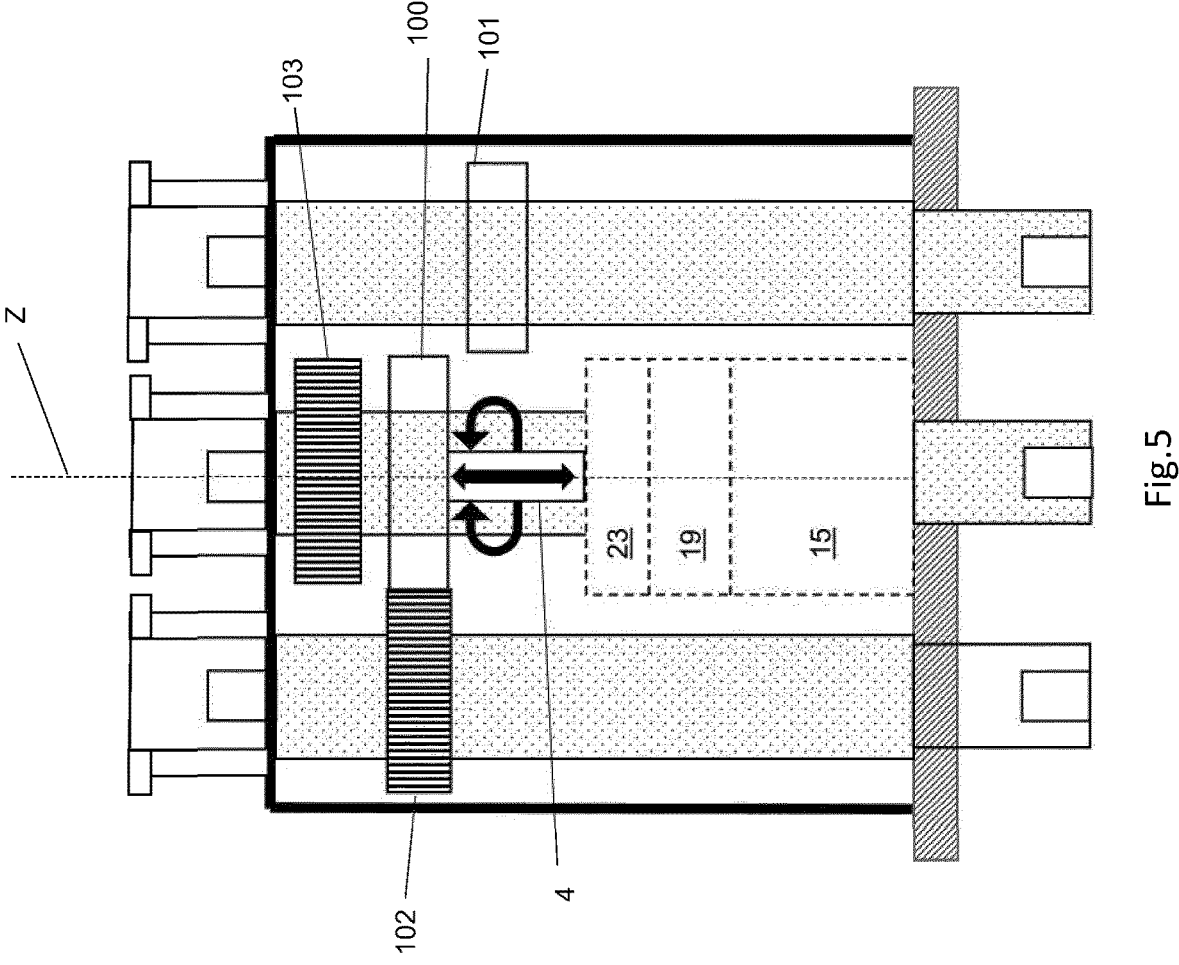
FIG. 5 is a schematic representation of an alternative embodiment of the invention from a side view where a drive gear is engaged with a second driven gear.
Figure 5:

FIG. 5 shows an embodiment of the invention with the same components as the embodiment of FIG. 4 where the drive gear 100 is engaged with the second driven gear 102.

Figure 6:
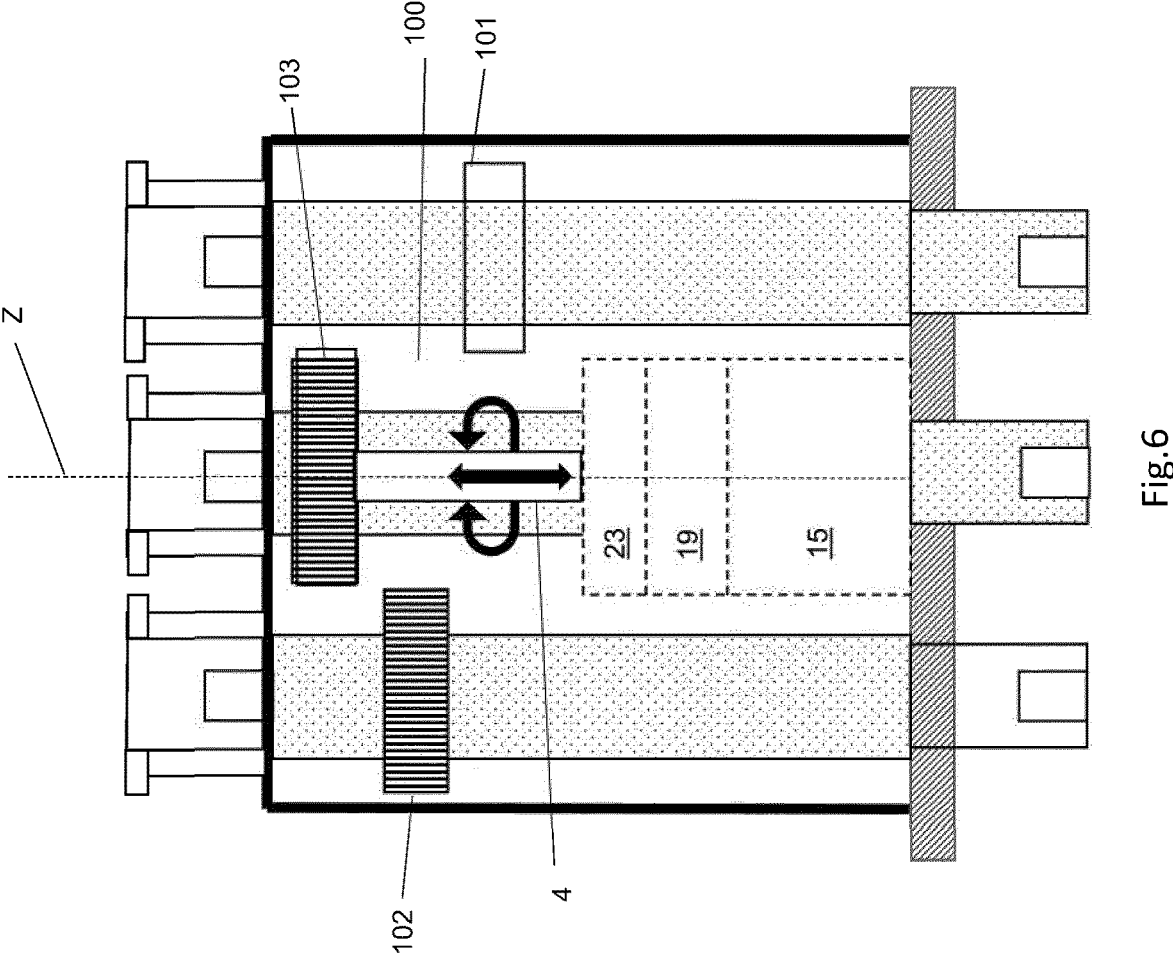
FIG. 6 is a schematic representation of an alternative embodiment of the invention in a side view where a drive gear is engaged with a third driven gear.
Figure 6:

FIG. 6 shows an embodiment of the invention with the same components as the embodiment of FIG. 4 where the drive gear 100 is engaged with the third driven gear 103.

Figure 7:
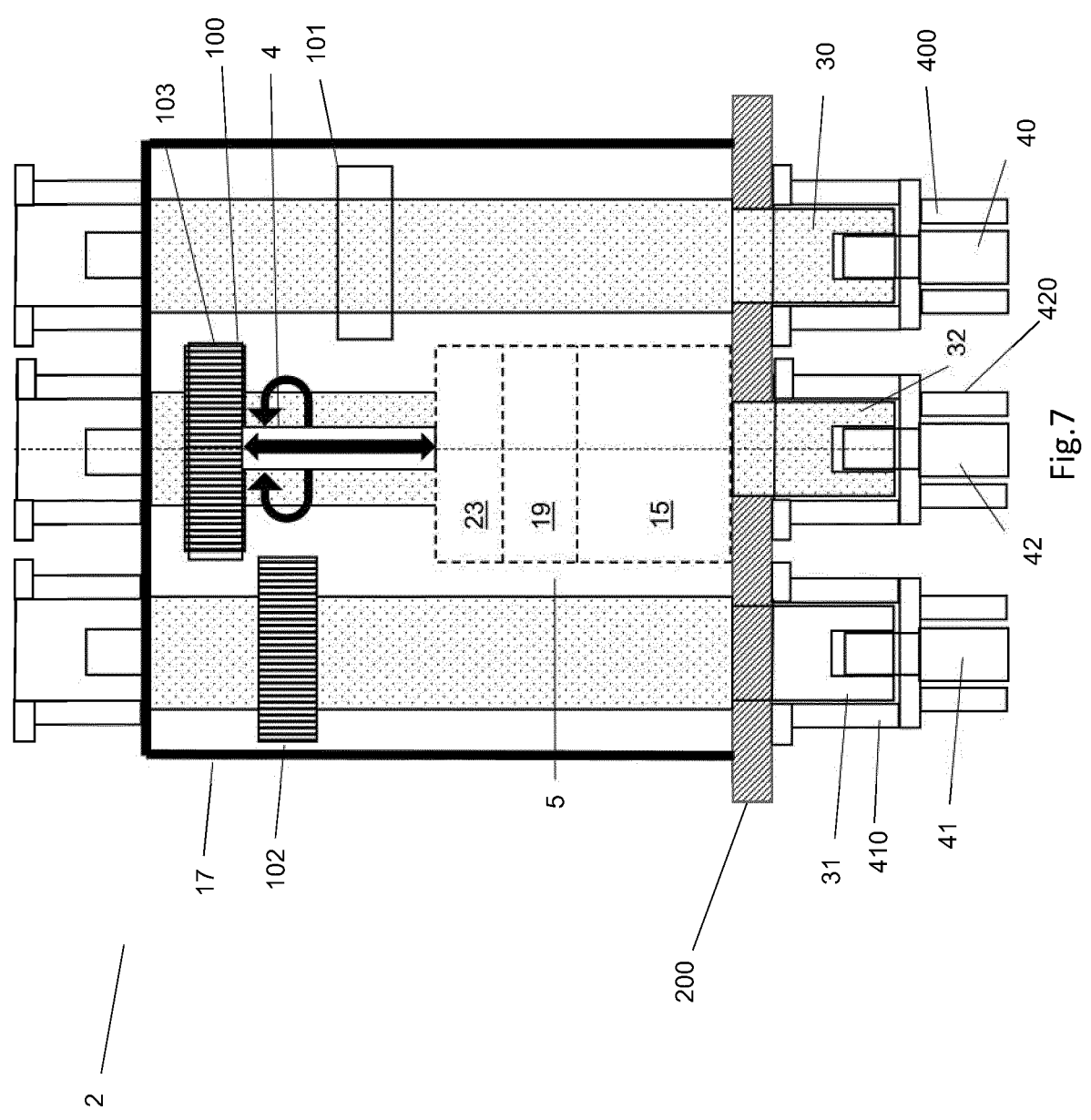
FIG. 7 is a schematic representation of an alternative embodiment of the invention in a side view landed on three manifold valve torque interfaces.

FIG. 7 shows an embodiment of the invention with the same components as the embodiment of FIG. 4 wherein the valve actuator 2 is landed on a valve assembly on a manifold (not shown). The first valve socket 30 is engaged with a first valve 40, the second valve socket 31 is engaged with a second valve 41 and a third valve socket 32 is engaged with a third valve 42. In this embodiment, the valves (40, 41, 42) include bucket type couplings (400, 410, 420), receiving the valve sockets (30, 31, 32).

FIG. 8 is a schematic representation of the components of the valve actuator. The controller is shown outside the drive assembly. A user interface manually or automatically receive input and monitor the status of the operational valves on the manifold from an operator topside. The valve actuator may be operated remotely by means of the user interface by an operator. The valve actuator is connected to a power supply through a controller providing electric power and/or pressurized fluid to the valve actuator. The drive assembly includes a linear actuator, a rotary actuator and the controller (shown externally of the valve actuator box). The controller is connected to the linear and the rotary actuators. The linear actuator drives the drive gear up or down as indicated by the arrows in the lower right corner from a retracted starting position to an extended end position. A position and/or force sensor monitor(s) the force and position of the drive gear and provide position feedback to the controller. The linear actuator is preferably electric, but could also be hydraulic. The controller starts and stops the linear actuator, positioning the gear shaft in a desired position for engaging a driven gear in order to open or close a valve. The rotary actuator provides rotational movement to the drive gear. The rotary actuator may be any type of rotary actuator and may include a stepping motor or an induction motor. A torque and/or a rotation sensor provides torque and rotation feedback to the controller. The torque sensor may indicate that a driven gear is stuck or that the valve is fully open or fully closed. The rotation sensor may count the number of turns in order to indicate whether the valves are open or closed. The torque sensor can indicate if the driven gear is prevented from rotating and something is wrong. The drive gear selectively engage one of the three driven gears operating the three valves to open or close the valves. The controller may control the power supply to start or stop the linear actuator and/or the rotary actuator based on the signals received from the sensors so that the correct driven gear is properly aligned and in mesh with the drive gear. The torque and force sensors prevent the valve actuator from exceeding force and torque limits thus preventing damaging the gears or other components.

This description mentions the operation of manifold valves, and the interaction between valve sockets and valves. The mentioned valves include valve stems with couplings attached to the end of the valve stems. The valve stem forms a part of the valve itself, and the term "valve" is meant to also cover the valve stem of the valve. The term valve torque interface may also be used for the valve stem. The mentioned valve actuator may also be used on a subsea hydrocarbon fluid recovery manifold.

The invention claimed is:

1. A hydrocarbon production manifold valve actuator comprising:
   a rotary actuator in driving relationship with a drive gear;
   a linear actuator adapted to shift the drive gear linearly along an axis of rotation of the drive gear between a first position in mesh with a first driven gear connected to a first valve operating shaft operating a first valve, and at least a second position in mesh with a second driven gear connected to a second valve operating shaft operating a second valve;
   a valve actuator controller connected to the rotary actuator and the linear actuator; and
   a position sensor monitoring the linear actuator, adapted to feed input to the controller, wherein the linear actuator is adapted to shift the drive gear linearly along the axis of rotation of the drive gear to a third position in mesh with a third driven gear connected to a third valve operating shaft operating a third valve; and
   wherein each of the first valve operating shaft and the second valve operating shaft is connected to a valve socket adapted to fit onto and engage each of the valves to be operated.

2. The valve actuator of claim 1, wherein each valve operating shaft is connected to an auxiliary coupling adapted to be operated by an override tool.

3. The valve actuator of claim 1, wherein each of the first and second valves being in driving relationship with a corresponding drive gear corresponds to a number of positions of the corresponding drive gear linearly along the axis of rotation.

4. The valve actuator of claim 1, wherein a drive gear shaft extends between the rotary actuator and the drive gear, and wherein the linear actuator is adapted to move the drive gear along a rotational axis of the drive gear shaft.

5. The valve actuator of claim 1, wherein a drive gear shaft extends between the rotary actuator and the drive gear, and wherein the linear actuator is adapted to move the drive gear shaft and the drive gear along an axis of rotation of the drive gear shaft.

6. The valve actuator of claim 1, wherein the valve actuator further includes an actuator base and a housing fixed to the actuator base providing a watertight room.

7. The valve actuator of claim 1, further including:
   a force sensor monitoring the linear actuator, adapted to feed input to the controller; and,
   a torque sensor and a rotation sensor monitoring the rotary actuator, adapted to feed input to the controller 15.

8. A method of operating a valve actuator according to claim 1, comprising the steps of:
   identifying a need for actuating one of the at least two valves;
   actuating the linear actuator to shift the drive gear linearly along the axis of rotation of the drive gear in mesh with the driven gear of the identified valve; and
   actuating the rotary actuator to operate the identified valve.

9. The method of operating the valve actuator of claim 8, wherein the step of actuating the rotary actuator to operate the identified valve is replaced with the step of actuating an auxiliary coupling to operate the identified valve.

10. The method of operating the valve actuator of claim 1, wherein the step of actuating the linear actuator to position the drive gear in mesh with the driven gear of the identified valve includes feeding a signal from a force and a position sensor to the valve actuator controller.

11. A method of installing a valve actuator according to claim 1, comprising the steps of:
   landing the valve actuator and engaging at least two valves on a subsea hydrocarbon production manifold;
   identifying a need for actuating one of the at least two valves;
   positioning the drive gear in mesh with the driven gear of the identified valve; and
   operating the valves.

* * * * *